United States Patent Office 3,330,862
Patented July 11, 1967

3,330,862
PROCESS FOR OXIDIZING HYDROCARBONS TO ACIDS
Walter L. Borkowski, Media, and William D. Vanderwerff, West Chester, Pa., assignors to Sun Oil Company, Philadelphia, Pa., a corporation of New Jersey
No Drawing. Filed Jan. 14, 1964, Ser. No. 337,547
7 Claims. (Cl. 260—515)

This invention relates to a novel process for the preparation of naphthalenedicarboxylic acids, and more particularly to an improved process for the production of 2,6-naphthalenedicarboxylic acid by the oxidation of alkylnaphthalenes and isomerization of the resultant naphthalenecarboxylic acids.

Naphthalenedicarboxylic acids and their lower alkyl esters, particularly dimethyl 2,6-naphthalenedicarboxylate, are useful in the preparation of polyester fibres and films. These monomer acids may be prepared by direct oxidation of either substantially pure 2,6-dimethylnaphthalene, or the more readily obtainable mixtures of alkylnaphthalene isomers such as methylnaphthalenes, dimethylnaphthalenes, trimethylnaphthalenes, ethylnaphthalenes and the like, such as those found in catalytic gas oil fractions obtained by solvent extraction of a catalytic gas oil distillation fraction boiling in the range of from about 485 to 515° F. to form the corresponding carboxylic acids, and thereafter converting these mixed acids to 2,6-naphthalenedicarboxylic acid by known disproportionation-isomerization methods. Thus, for example, one method of preparing naphthalenedicarboxylic acids (sometimes referred to as NDCA) from dialkylnaphthalenes has been to oxidize a dimethylnaphthalene (sometimes referred to as DMN) with sodium dichromate in accordance with the following equation:

While this is generally a satisfactory method, it is necessary to employ a buffered reaction system since the NaOH produced during the oxidation will convert the remaining dichromate to unreactive chromate:

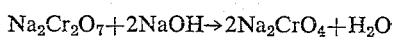

In practice a convenient buffer is a 50% excess of the dichromate oxidizing agent; the reaction then becomes:

This excess of dichromate is not only costly, but it thereafter makes the resulting separation of the product and spent reagent, as well as the recovery of the sodium chromate, technically and economically unattractive.

Moreover, when mixtures of isomeric alkylnaphthalenes are employed as starting materials, it is then necessary to convert the resulting mixture of naphthalenecarboxylic acids to the more commercially valuable 2,6-naphthalenedicarboxylic acid by a disproportionation-isomerization reaction such as the Henkel process. This process involves heating a potassium or cesium salt of a naphthalenecarboxylic acid to a temperature in the range of 350–530° C. in the presence of a catalyst which is a salt or oxide of cadmium, zinc, or mercury and in a carbon dioxide atmosphere at a pressure of from about 50 to 750 p.s.i.g. This effects isomerization of the carboxyl groups to the 2,6-positions. This rearrangement will occur regardless of whether one or more carboxyl groups are present on the nucleus or whether, if two such groups are present, they are located on the same ring or on different rings of the naphthalene nucleus. However, the effectiveness of this disproportionation-isomerization process can be seriously impaired by the presence of certain inorganic salts, such as bicarbonates, in the oxidation reaction mixture which quickly poison this reaction. Thus, while the dichromate oxidation of alkylnaphthalenes is a generally desirable one, it requires the use of excess oxidant or other buffering agent; also, in the case of mixed acids which are subsequently to be isomerized, the additional treatment required to prepare the required potassium or cesium salts of the naphthalenecarboxylic acids free of inorganic salts results in increased cost and reduced yields of the desired end product. The latter result largely from the appreciable water-solubility of some of the isomeric naphthalenecarboxylic acids.

Therefore, it is an object of the present invention to provide a method of oxidizing alkylnaphthalenes, and particularly dialkylnaphthalenes such as 2,6-dimethylnaphthalene to the corresponding naphthalenecarboxylic acids with substantial economy and simplicity of operation over prior processes.

It is a further object of this invention to provide a process for the oxidation of mixed alkylnaphthalene isomers, the reaction product of which may be directly subjected to a disproportionation-isomerization reaction without any preliminary purification and resultant losses, to form 2,6-naphthalenedicarboxylic acid in high yield.

It has now been found, in accordance with the present invention, that these and other objects may be achieved by oxidizing alkylnaphthalenes with a suitable oxidizing agent in the presence of carbon dioxide, the cation of said oxidizing agent having the property of forming a water-soluble salt with the naphthalenecarboxylic acid but not with the resulting carbonic acid. This process is most advantageous in that the carbon dioxide not only functions as the buffering agent, but in addition, it precipitates the selected cation as the insoluble carbonate; thus, the salts of the product naphthalenecarboxylic acids are the only water-soluble species present at the completion of the reaction and their isolation requires only filtration and evaporation of the water. While this method is preferably employed in the oxidation of pure alkylnaphthalenes, nevertheless, in the case of mixed isomers, the resulting mixed carboxylate salts may be readily converted to their corresponding potassium or cesium salts by known methods and then charged directly to the disproportionation-isomerization process to produce 2,6-naphthalenedicarboxylic acid without any purification steps such as are necessary in the prior art methods.

The most suitable oxidizing agents useful in this process, it has been found, are chromate salts, the cation of which is preferably lithium in that it forms an insoluble carbonate, yet can be readily recovered and regenerated to the corresponding lithium chromate by known methods for further reuse in the oxidation process.

In one embodiment of this process, the alkylnaphthalene starting material may be oxidized to form the corresponding carboxylate salt in accordance with the following equation:

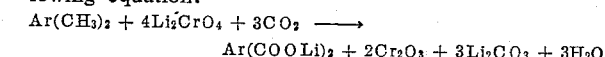

This reaction is desirably carried out in an aqueous medium at a temperature of about 100–300° C. and preferably at about 250° C., for about 2–6 hours, at a pH of from about 4 to 8, the carbon dioxide having been introduced under pressure into the reaction vessel before the reaction is initiated. The reaction mixture is then cooled and filtered to remove the precipitated $Cr_2O_3$ and $Li_2CO_3$; the filtrate is extracted with a suitable organic solvent such as ether, or a low boiling hydrocarbon solvent to remove any unreacted starting material. The remaining filtrate is then boiled for an additional 1–3 hours to convert any soluble $LiHCO_3$ to $Li_2CO_3$, which is then removed by filtration.

The resulting lithium salt of the aromatic carboxylic acid may then be acidified, as for example with dilute hydrochloric acid, to form the corresponding free acid, and thereafter the potassium or cesium acid salt prepared for direct charging into the Henkel reaction. Alternatively, the lithium salt may then be directly esterified, as for example with methanol, to form the corresponding dimethylnaphthalenedicarboxylate. As an additional feature of this invention, this esterification may be carried out in accordance with the following equation:

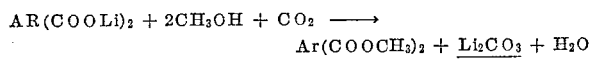

This reaction, which is characterized by the recovery of additional lithium carbonate suitable for regeneration of lithium chromate, is most desirably carried out at a lower temperature than the original oxidation, preferably at 50–200° C., the $CO_2$ being introduced at a pressure of from 100 to 1000 p.s.i.

In a further embodiment of this process, it has been found that the additional step of converting the lithium salts of the mixed acids prepared in accordance with the foregoing process to the necessary potassium or cesium salt suitable for use in the Henkel process may now very conveniently be avoided by employing, together with carbon dioxide combinations of oxidizing agents wherein one of the cations is lithium or other suitable cations which will form insoluble carbonate salts, while the other cation is either potassium, cesium, or a mixture thereof which will react with the resulting carboxylic acid to form the desired water-soluble carboxylate salt. Thus, for example, potassium chromate, cesium chromate or the like may be utilized in combination with lithium chromate in accordance with the following equation:

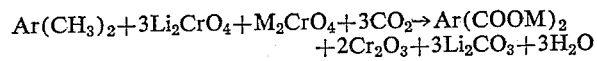

where M is potassium or cesium. The resulting mixture of isomeric carboxylate salts may then be charged directly to the disproportionation-isomerization process to produce salts of 2,6-naphthalenedicarboxylic acid without any purification steps or conversion to the cesium or potassium salts as are necessary in the prior art methods. It will be understood, of course, that this process may also be employed in the oxidation of 2,6-dimethylnaphthalene, in which case M may be any metal which forms a soluble salt with both the resulting acid and carbonate, to form the dimetal salt of 2,6-naphthalenedicarboxylic acid.

The reaction conditions employed when combinations of oxidizing agents are used are essentially as described hereinabove with respect to the first embodiment. Thus, following the introduction of carbon dioxide and heating the reaction mixture for from 2–6 hours, the precipitated oxides and carbonates are removed by filtration and the filtrate extracted with an ether to remove unreacted starting material. In the case where crude aromatic charge stocks are used as starting materials, other substances such as decalins, tetrahydronaphthalenes, acenaphthenes and the like which may be present are converted to their corresponding tetralones, quinones, etc. and are likewise removed by the ether extraction step. If the initial reaction mixture is heated sufficiently prior to filtering off the precipitates, additional heating to convert the intermediate $LiHCO_3$ is not necessary, in which case the reaction product may readily be recovered by stripping the filtrate to dryness. Alternatively, when the starting material is other than 2,6-dimethylnaphthalene, the filtrate containing the mixed carboxylate salts, after evaporation of the water, may be charged directly to the disproportionation-isomerization step to yield 2,6-naphthalenedicarboxylic acid.

It will be recognized by those skilled in the art that the stoichiometry and reaction conditions may be varied in accordance with the nature of the starting material, depending upon the relative proportions of mono-, di- and trialkylnaphthalenes in the charge stock as well as non-naphthalenic materials. It will be appreciated from the foregoing description that one of the lunique advantages of this modified naphthalene oxidation process for the preparation of 2,6-naphthalenedicarboxylic acid is its ability to utilize crude mixtures of alkylnaphthalenes as the charge stock without the need for purification either before or after the oxidation process. Also, this process is advantageous in that the precipitated solids may conveniently be regenerated without prior separation or purification to reform the original oxidizing agent suitable for reuse. Thus, for example, when the only cation employed is lithium, the resulting mixture of lithium carbonate and chromic oxide may be regenerated by kiln roasting, pressure oxidation or other well-known means to form lithium chromate. Similarly, where cesium, sodium or potassium dichromate or chromate is employed, the cation which is removed in the form of the carboxylate salt is readily replenished by the addition of the corresponding hydroxide, carbonate or other suitable form to the precipitated solids prior to regeneration and the lithium-cesium sodium and/or potassium chromate mixture or the like is recovered.

The following examples are given by way of illustration and are not to be regarded as limitations of this invention:

*Example 1*

28.4 g. of a catalytic gas oil extract containing 20% by weight of methylnaphthalenes, 8% ethylnaphthalenes, 53% dimethylnaphthalenes, 9% trimethylnaphthalenes and 10% other aromatics is charged to a one-liter rocking autoclave with 29.3 g. (0.15 mole) of potassium chromate, 58.5 g. (0.45 mole) of lithium chromate and 200 ml. of water. The autoclave is then pressured with 480 p.s.i. of carbon dioxide and subsequently heated at 250° C. for four hours. The crude reaction mixture is filtered, the solid washed with ether and the filtrate extracted with ether. Evaporation of the ether washes and extracts gives 8.4 g. of unreacted hydrocarbons. The solids consist of 49.5 g. of chromic oxide and 10.9 g. of lithium carbonate. The aqueous filtrate is boiled for two hours, then filtered hot to obtain 17.4 g. of precipitated lithium carbonate. Evaporation of the filtrate gives 31.4 g. of potassium salts of mixed naphthalenecarboxylic acids (98.5% of theory) and 5.4 g. of lithium carbonate.

The recovered lithium carbonate is combined with the filter cake for the first filtration, which consists of a mixture of chromic oxide and lithium carbonate, for regeneration of the lithium and chromates by roasting with added potassium carbonate.

*Example 2*

27.8 g. of catalytic gas oil extract is charged to a one-liter rocking autoclave with 58.5 g. of lithium chromate (0.45 mole), 57.3 g. of cesium chromate (0.15 mole), and 200 ml. of water. The autoclave is then pressured with 480 p.s.i. of carbon dioxide and then heated at 250° C. for four hours. The crude reaction mixture is boiled vigorously for two hours and filtered hot, the solids washed with ether and the filtrate extracted with ether. The solids consist of 49.5 g. of chromic oxide and 17.4 g. of lithium carbonate. The ether washes and extracts contain 8.3 g. of unreacted hydrocarbons. Evaporation of the aqueous filtrate gives a 98% yield of cesium salts of mixed naphthalenecarboxylic acids containing 4.0 g. of lithium carbonate.

The recovered lithium carbonate is combined with the filter cake from the first filtration, which consists of a mixture of chromic oxide and lithium carbonate, for regeneration of the lithium and chromates by roasting with added cesium carbonate.

Example 3

To a one-liter rocking autoclave is charged 27.5 g. of an aromatic extract of catalytic gas oil containing approximately 90% by weight of a mixture of methyl-, ethyl-, dimethyl- and trimethyl-naphthalenes, and 10% other aromatics 58.8 g. (0.45 mole) of lithium chromate, 200 ml. of water and 480 p.s.i. of carbon dioxide. The autoclave is then heated at 250° C. for four hours, cooled and the reaction mixture filtered. The filter cake and filtrate are both washed with ether. Evaporation of the later gives 7.5 g. of unreacted hydrocarbons. The aqueous filtrate is boiled vigorously to convert the lithium bicarbonate to insoluble lithium carbonate which is then filtered off hot. The aqueous filtrate is dried to yield 24.9 g. of the lithium salts of the mixed naphthalenecarboxylic acids.

Acidification with hydrochloric acid of the above aqueous filtrate of lithium salts, in lieu of drying the filtrate, yields 21.5 g. of mixed naphthalenecarboxylic acids; etc. an additional 2.2 g. of water-soluble acids is recovered from solution by extraction with ether. The total yield in acids is 98.5% of theory.

Example 4

31.2 g. (0.20 mole) of 2,6-dimethylnaphthalene is charged to a one-liter rocking autoclave with 24.3 g. (0.15 mole) of sodium chromate, 58.4 g. (0.45 mole) of lithium chromate, 200 ml. of water and 480 p.s.i. of carbon dioxide and heated for four hours at 250° C. The crude reaction mixture is filtered and the solids washed with ether and the filtrate extracted with ether. The filtrate is then boiled vigorously for two hours and filtered hot to remove the precipitated lithium carbonate. Evaporation of the aqueous filtrate yields 69.8 of the disodium salt of 2,6-naphthalenedicarboxylic acid (97% yield based on dimethylnaphthalene reacted).

Example 5

To a one-liter rocking autoclave is charged 31.2 gms. (0.20 mole) of 2,6-dimethylnaphthalene, 103.9 gms. (0.80 mole) of lithium chromate, 200 ml. of water, and 480 p.s.i. of carbon dioxide. The autoclave is heated at 250° C. for three hours. The cooled reaction mixture is then filtered and both the filter cake and filtrate are washed with hexane. Evaporation of the washes yields 0.8 gms. of unreacted 2,6-dimethylnaphthalene. The aqueous filtrate is boiled vigorously for three hours and filtered hot to recover the precipitated lithium carbonate. The filtrate from the second filtration is evaporated to yield 43.2 gms. of the lithium salt of 2,6-naphthalenedicarboxylic acid.

Example 6

Three grams of the potassium salts of the mixed acids obtained in accordance with the process of Example 1 are mixed with 0.10 gm. of cadmium oxide, placed in a 300 ml. bomb, put under 300 p.s.i. pressure of carbon dioxide, and heated to 500° C. When the temperature reaches 500° C., the heating units are shut down, and the bomb allowed to cool. The reaction products are washed with ether to extract 0.38 gm. of naphthalene. The product is then washed with water, the water wash filtered and acidified with 5 ml. of hydrochloric acid to give 1.53 gms. of acidic products. Analysis of these acids by vapor phase chromatography of their methyl esters, and infrared spectroscopy of the acids and their esters demonstrates that 86% of the acidic product is 2,6-naphthalenedicarboxylic acid.

Example 7

Six grams of the cesium salts of the mixed acids obtained in acordance with Example 2 are mixed with 0.10 gm. of zinc oxide and charged to a 300 ml. bomb under 300 p.s.i. pressure carbon dioxide. The bomb is heated to 400° C., at which temperature the heaters are shut down and the bomb allowed to cool. The reaction products are washed with ethyl ether to yield 0.47 gm. of naphthalene. The water wash of the products is filtered and acidified to give 0.92 gm. of acids. Analysis of these acids by infra-red spectroscopy show that 75% of the product acids is 2,6-naphthalenedicarboxylic acid.

The following example is presented to illustrate the difficulties inherent in the prior art method for preparing the charge stock for a Henkel isomerization-disproportionation reaction where the starting material contains a mixture of isomeric alkylnaphthalenes.

Example 8

54.6 gms. of a catalytic gas oil extract containing 20 percent by weight of methylnaphthalenes, 53 percent dimethylnaphthalenes, 8 percent ethylnaphthalenes, 9 percent trimethylnaphthalenes and 10 percent other aromatics is charged to a one-liter rocking autoclave with 300 gms. of sodium dichromate dihydrate and 650 ml. of water and heated at 250° C. for four hours. The cooled reaction mixture is filtered and extracted with ether to recover 1.14 gms. of unreacted substrate. The filtrate, containing the sodium salts of the mixed dicarboxylic acids, is then chilled, acidified with hydrochloric acid, and the precipitated acids filtered, washed with water and dried. 43.1 gms. of mixed acids are thus obtained, corresponding to a yield of 65.8 percent.

2.25 gms. of this product are dissolved in dilute potassium hydroxide and the solution evaporated under vacuum to obtain 3.02 gms. of potassium salts. These salts, after careful drying, are mixed with 0.10 gm. of cadmium oxide, placed in a 300 ml. bomb, pressured with 300 p.s.i. of oxygen-free carbon dioxide and heated to 500° C. After a similar work up with hydrochloric acid, 1.56 gms. of acids are obtained which contain 85 percent 2,6-naphthalenedicarboxylic acid.

The invention claimed is:

1. A process for the preparation of salts of 2,6-naphthalenedicarboxylic acid which comprises (1) reacting a catalytic gas oil extract containing a mixture of isomeric alkylnaphthalenes with a stoichiometric amount of a mixture of at least two oxidizing agents in the presence of carbon dioxide at elevated temperatures to form a mixture of the corresponding water-soluble naphthalenecarboxylate salts and water-insoluble carbonate salts, one of said oxidizing agents being selected from the group consisting of potassium chromate and cesium chromate, the remaining oxidizing agent being lithium chromate in a mole ratio of about 3:1 in favor of lithium, (2) recovering the mixture of water-soluble naphthalene carboxylate salts from the insoluble lithium carbonate salts and (3) heating said mixture at temperatures in the range of about 100 to 300° C. under a carbon dioxide atmosphere in the presence of a heavy metal catalyst to form the corresponding salt of 2,6-naphthalenedicarboxylic acid.

2. The process which comprises reacting a catalytic gas oil extract containing a mixture of isomeric alkylnaphthalenes, dialkylnaphthalenes, and trialkylnaphthalenes with a stoichiometric amount of potassium chromate and lithium chromate in a mole ratio of about 3:1 in favor of lithium in the presence of carbon dioxide at an elevated temperature, and recovering the potassium salts of the corresponding mixed naphthalenecarboxylic acids and reacting said acid salts with cadmium oxide in the presence of carbon dioxide at temperatures in the range of about 100 to 300° C. and pressures to form the dipotassium salt of 2,6-naphthalenedicarboxylic acid.

3. The process which comprises reacting a catalytic gas oil extract containing a mixture of isomeric alkylnaphthalenes, dialkylnaphthalenes and trialkylnaphthalenes with a stoichiometric amount of lithium chromate and cesium chromate in a mole ratio of about 3:1 in favor of lithium in the presence of carbon dioxide at an elevated temperature, and recovering the cesium salts of the corresponding mixed naphthalenecarboxylic acids and reacting said carboxylate salts with zinc oxide in the presence of carbon dioxide at temperatures in the range of about 100 to 300° C. and pressure to form the dicesium salt of 2,6-naphthalenedicarboxylic acid.

4. A process for the preparation of water-soluble salts of 2,6-naphthalenedicarboxylic acid which comprises reacting a 2,6-dialkylnaphthalene with a mixture of at least two oxidizing agents in the presence of carbon dioxide at temperatures in the range of about 100 to 300° C., one of said oxidizing agents being selected from the group consisting of sodium chromate, potassium chromate, and cesium chromate, the remaining oxidizing agent being lithium chromate, said mixture of oxidizing agents being in a mole ratio of about 3:1 in favor of lithium and recovering said water-soluble 2,6-naphthalenedicarboxylic salt from the insoluble carbonate salts.

5. The process according to claim 4 wherein the recovered acid salt is further reacted with an inorganic acid to form the corresponding free 2,6-naphthalenedicarboxylic acid.

6. The process which comprises reacting 2,6-dimethylnaphthalene with a mixture of sodium chromate and lithium chromate, said mixture being in a mole ratio of 3:1 in favor of lithium, in the presence of carbon dioxide at a temperature in the range of about 100 to 300° C. and recovering the disodium salt of 2,6-naphthalenedicarboxylic acid.

7. A process for the preparation of water-soluble naphthalenecarboxylate salts which comprises reacting a catalytic gas oil extract containing a mixture of isomeric alkylnaphthalenes which have at least one alkyl group attached to the aromatic nucleus with a stoichiometric amount of a mixture of at least two oxidizing agents in the presence of carbon dioxide at temperatures in the range of about 100 to 300° C. to form a mixture of the corresponding water-soluble naphthalenecarboxylate salts and water-insoluble carbonate salts, one of said oxidizing agents being selected from the group consisting of potassium chromate and cesium chromate, the remaining oxidizing agent being lithium chromate in a mole ratio of about 3:1 in favor of lithium, and recovering the mixture of water-soluble naphthalenecarboxylic acid salts from the insoluble carbonate salts.

References Cited

UNITED STATES PATENTS

| | | | |
|---|---|---|---|
| 1,998,925 | 4/1935 | Demant | 260—524 |
| 2,005,774 | 6/1935 | Demant | 260—524 |
| 2,849,482 | 8/1958 | Raecke et al. | 260—524 |

LORRAINE A. WEINBERGER, *Primary Examiner.*

SIDNEY B. WILLIAMS, *Assistant Examiner.*